(12) United States Patent
Weber et al.

(10) Patent No.: US 7,832,016 B2
(45) Date of Patent: Nov. 9, 2010

(54) MICROPROCESSOR SYSTEM AND METHOD FOR DETECTING THE EXCHANGE OF MODULES OF THE SYSTEM

(75) Inventors: Jochen Weber, Markgroeningen (DE);
Klaus Schneider, Ludwigsburg (DE);
Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 1331 days.

(21) Appl. No.: 10/801,363

(22) Filed: Mar. 15, 2004

(65) Prior Publication Data
US 2004/0260938 A1    Dec. 23, 2004

(30) Foreign Application Priority Data
Mar. 14, 2003    (DE)    ................................ 103 11 249

(51) Int. Cl.
*H04L 9/30*    (2006.01)
*G06F 12/14*    (2006.01)
*G08B 29/00*    (2006.01)

(52) U.S. Cl. .......................... 726/34; 713/192; 713/193; 713/194; 380/30; 380/282; 380/295

(58) Field of Classification Search ........................ None
See application file for complete search history.

(56) References Cited

U.S. PATENT DOCUMENTS

| | | | | |
|---|---|---|---|---|
| 4,731,842 A | * | 3/1988 | Smith | ........................... 705/71 |
| 5,771,287 A | * | 6/1998 | Gilley et al. | ................. 713/191 |
| 5,774,544 A | * | 6/1998 | Lee et al. | ..................... 713/189 |
| 6,026,293 A | * | 2/2000 | Osborn | ........................ 455/411 |
| 6,556,680 B1 | * | 4/2003 | Leonardi | ..................... 380/247 |
| 6,792,113 B1 | * | 9/2004 | Ansell et al. | ................. 380/284 |
| 6,948,071 B2 | | 9/2005 | Schneider et al. | |
| RE39,166 E | * | 7/2006 | Gammie | ..................... 380/228 |
| 7,110,830 B2 | * | 9/2006 | Weber et al. | ................... 700/5 |
| 7,308,718 B1 | * | 12/2007 | Brookner | ..................... 726/29 |

FOREIGN PATENT DOCUMENTS

| DE | 101 26 451 | 12/2002 |
|---|---|---|
| JP | 2001-350370 | 12/2001 |
| JP | 2003-22218 | 1/2003 |

* cited by examiner

*Primary Examiner*—Nasser Moazzami
*Assistant Examiner*—Fatoumata Traore
(74) *Attorney, Agent, or Firm*—Kenyon & Kenyon LLP

(57) ABSTRACT

In order to detect the exchange of a module, identified by a serial number, in a microprocessor system,
a code number, which is obtained from the serial number by using an encryption method, as well as information required for calculating the serial number from the code number, are stored in the microprocessor system;
the code number is read and an unencrypted serial number is calculated from the code number with the aid of the information; and
the decrypted serial number thus obtained is compared to the serial number of the module and the module is detected as exchanged if its serial number does not match the decrypted serial number.

19 Claims, 1 Drawing Sheet

MICROPROCESSOR SYSTEM AND METHOD FOR DETECTING THE EXCHANGE OF MODULES OF THE SYSTEM

BACKGROUND INFORMATION

The present invention relates to the prevention of manipulations of microprocessor systems, in particular of engine-control devices for motor vehicles. Such devices are generally configured as microprocessor systems having a microprocessor, a program and main memory for the microprocessor and one or a plurality of interfaces for the communication with sensors and actuators on the engine. By manipulating the control program of the processor, it is possible to influence the behavior of the engine so as to achieve higher engine output, for example. Power-output limitations, which are required to prevent possibly harmful overload situations of the engine or which are mandated by law, may be circumvented in this manner. Consequently, there is a need for technology that makes unauthorized manipulations of such microprocessor systems impossible or at least makes them more complicated in a deterring manner.

One technique known and utilized for this purpose is the cementing of modules of such a microprocessor system. However, it has become apparent that no adhesive agent is available that is not able to be undone again in some manner. Another serious disadvantage of cementing is that it not only makes unauthorized manipulations more difficult, but repairs of the microprocessor system as well.

SUMMARY OF THE INVENTION

The present invention provides a microprocessor system and a method for exchanging a module in such a system, which make an unauthorized exchange much more difficult yet do not compromise the repair ease of the system. The degree of difficulty is so high that in most cases the benefit obtainable by the manipulation does not justify the effort to be expended for this purpose, so that the manipulation makes no sense from an economical point of view.

The present invention is based on a microprocessor system having a plurality of modules, among them a microprocessor and at least one storage module for storing the code and data for the microprocessor. At least one of the modules stores a serial number of this module in a non-changeable manner. It is common practice during the manufacture of microprocessors to provide them with a serial number that is able to be queried with the aid of software, clearly identifies each microprocessor and cannot be changed in the finished microprocessor. Non-volatile memory modules, in particular flash memories, having serial numbers are available as well.

The present invention provides for a code number and information, in particular a program code and a key, to be stored in the microprocessor, the code number having been obtained from the serial number of the at least one module identified by a serial number, with the aid of an encryption method. This information enables the microprocessor to calculate from the code number a serial number that should match the serial number of the module if the microprocessor system has not been manipulated. In the event that the system was manipulated and the module has been replaced by another having, by necessity, a different serial number, this will be detected; appropriate measures may then be taken in that the microprocessor executes certain sections of its code provided for such an eventuality, for example, or refuses the execution of code sections that are relevant to its normal function. If the microprocessor system is an engine control device and the vehicle has the appropriate equipment, including a display device, it is possible to display there a message for the driver that certain functions of the microprocessor system are blocked due to a fault in the system, or the system may prevent the start-up of the engine.

The encryption method by which the code number is obtained from the serial number is preferably an asymmetrical method, i.e., a method that uses different keys for encryption and decryption. The so-called public key used for decryption, which allows the serial number to be calculated from the code number in reverse, may not be utilized for conversely calculating a code number from a serial number. Therefore, even if aware of the encryption and able to extract the public key stored in the system, an unauthorized person will be unable to determine from it a correct code number that matches a serial number of a module he wishes to install in the system as replacement for a module that is marked by a serial number. As a result, no special measures are required to prevent an unauthorized person from extracting from the microprocessor system the information required for calculating the serial number from the code number.

An important module of the microprocessor system which should be protected from unauthorized exchange is a storage module, in particular a storage module that includes the program code and/or parameter tables for the control task to be implemented by the microprocessor system. The code number calculated from the serial number of such a storage module may be stored in just this storage module without endangering security.

Another module that is usefully protected according to the present invention is the microprocessor of the system itself. Storing the information required to calculate the serial number from the code number in the same storage module as the code number is inadvisable. An exchange of this module by an unauthorized person would be very difficult even when using the same module for storage, due to the fact that, to be able to replace this module with an operative other module, this person would first have to understand the meaning of the individual data stored therein. Nevertheless, the separation provides an additional safety margin, since it is basically impossible for the exchange of a single module to remain undetected and the operativeness of the system to be maintained. This makes it much more difficult for an unauthorized person to obtain information that would allow him to understand and circumvent the security measures through inspection of the microcomputer system.

In order to make it much harder for an unauthorized person to manipulate the information required to calculate the serial number, the storage module containing this information is connected to the microprocessor system, preferably in an inseparable manner, possibly by integrating both in a one-chip microprocessor.

An additional security margin may be realized if, in those cases where the microprocessor system includes a plurality of modules, each of which is marked by a serial number, the code number is obtained by the joint encryption of these serial numbers. If this is done, a single decryption operation will suffice to ascertain in all modules whose serial numbers have been entered into the code number whether or not they have been exchanged.

DETAILED DESCRIPTION

Figure 1:
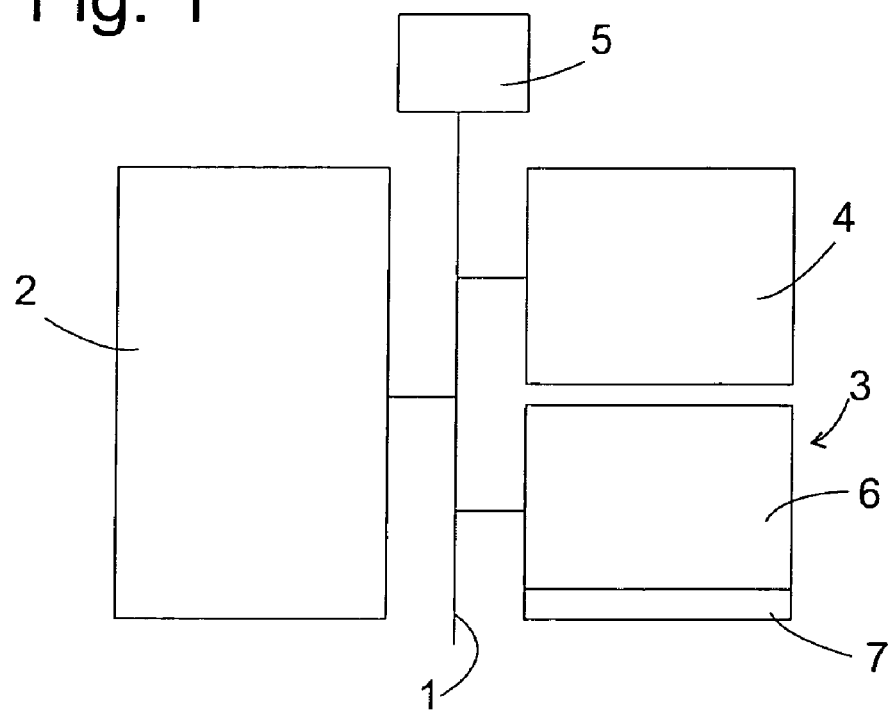
FIG. 1 shows a block diagram of a microprocessor system in which the present invention is realized.
Figure 2:
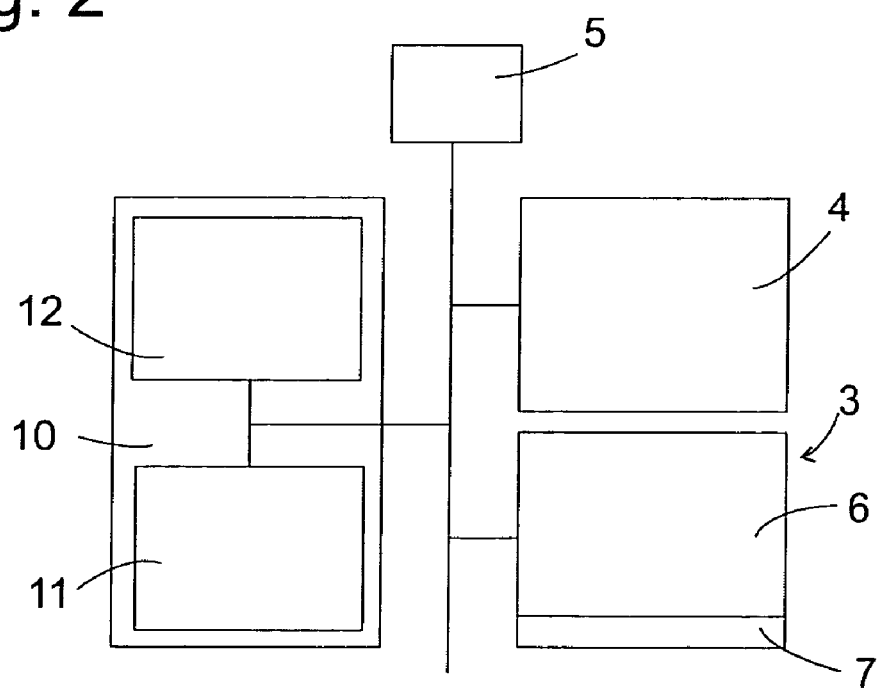
FIG. 2 shows a block diagram of a second such microprocessor system.

FIG. 1 shows a block diagram of an engine-control device according to the present invention. Connected to a bus 1 on a printed circuit board are a microprocessor 2, a non-volatile storage module 3, a write-read memory module 4 and an interface 5 for the communication with sensors and actuators (not shown) of the engine to be controlled. Modules 2, 3, 4 are each formed by IC's which are separate from each other. Non-volatile storage module 3 has a main memory location 6, addressable in a conventional manner, onto which the manufacturer of the engine-control device has written program instructions and parameter fields for microprocessor 2 and which is addressable in a conventional manner for reading via bus 1. Furthermore, storage module 3 includes a temporary memory location 7 onto which the manufacturer of storage module 3 has already written a serial number that is specific to each individual storage module of a particular type. The content of temporary memory location 7 is readable via bus 1 as well, but the format of the address signals required to read out temporary memory location 7 differs from that for addressing main memory location 6. For example, to read temporary memory location 7, it may be required, for instance, that a password be first applied to the storage module via bus 1. This excludes the possibility of replacing storage module 3 with a pin-compatible memory module delivered without serial number by the manufacturer, in which only the serial number of storage module 3 has been copied into a conventionally addressable memory location. Module 3 may therefore be replaced only by a module of the same type, but different serial number.

Main memory location 6 of storage module 3 stores not only the program instructions and parameters required for the control tasks of the engine-control device, but also a code number and program instructions which microprocessor 2 is able to execute in order to calculate the serial number stored in temporary memory location 7 from the code number. This calculation is implemented at each start-up of the system and/or in regular time intervals during its operation. If a comparison of the serial number calculated from the code number and the serial number in temporary memory location 7 shows that the two do not match, this indicates that storage module 3 must have been replaced. In this case, the program instructions stored in storage module 3 provide for a blocking of the operation of the control device or at least a blocking of individual functions essential for the functioning of the engine it controls.

If storage module 3 is a flash memory, such a blocking of functions is realized very easily in that the microprocessor applies a reset signal to storage module 3, which deletes the data stored therein.

An unauthorized person wishing to exchange storage module 3 for another in which the program instructions or parameters for microprocessor 2 are modified, may successfully accomplish this only by analyzing the program code contained in module 3 and either modifying it in such a way that all checks of the serial number are prevented or by reconstructing the calculation of the serial number from the code number and entering a code number that matches the serial number in the storage module to be used as replacement.

A considerably greater security margin may be obtained if microprocessor 2 in the control device according to FIG. 1 is replaced by a one-chip microcomputer 10 into whose one chip a microprocessor 12 and non-volatile program memory 11 are integrated, which communicate via an internal bus that is not led out of the chip. If at all, access to the content of program memory 11 is possible only by opening the housing of the chip, which requires considerable effort and entails the danger of destruction of the chip. Program memory 11 includes a boot procedure for microprocessor 12, which encompasses at least the calculation of the serial number from the code number stored in storage module 3, the reading of the serial number of storage module 3 and the complete or partial blocking of the control device if no match exists. Without access to microcomputer 10 itself, it is impossible to prevent the check of the code number in this case, so that a successful exchange of storage module 3 requires the ability to determine the code number matching the serial number of the storage module to be installed. This is made virtually impossible for an unauthorized person if the manufacturer of the control device has used an asymmetrical encryption method to calculate the code number from the serial number of storage module 3. Such methods are known in great numbers, for instance under the name of RSA (Rivest, Shamir, Adelman), Polig-Hellman, Diffie-Hellman, ElGamal, etc. All of these algorithms have in common that they use a secret key for encryption of a message, in this case, the serial number of storage module 3, and a public key for decryption of the message, and that the public key allows no conclusions to be drawn concerning the secret key and thus may not be used to encrypt a message. That means that, even if the unauthorized person is able to read the key stored in program memory 11 and the program instructions for calculating the serial number from the code number using this key, this would still not enable him to construct the matching code number for a storage module 3 to be newly installed, which would convince microcomputer 10 to accept the exchanged module as genuine.

The afore-described method for detecting the exchange of a module by calculating a serial number from a code number assigned to the module and by comparing the calculated serial number to the actual serial number of the module may easily be generalized for a plurality of modules to be protected from exchange. For one, it is possible, of course, to store for each module an individual code number from which the serial number of the module may be calculated in reverse. It is more economical, however, if the manufacturer encrypts a linking of the serial numbers of all modules that are to be protected and enters it into storage module 3 or some other suitable memory of the control device as a single code number that is valid for all modules. A one-time implementation of the decryption method will then suffice to calculate the serial numbers of all protected modules. Since the calculation of the code number presupposes knowledge of all serial numbers of any modules that are to be installed and protected in the control device, and since it requires considerable effort to find out these serial numbers prior to assembly of the device, the control device is assembled first in this case; then, the serial numbers of all modules to be protected are read out of the control device, the code number is calculated and only then is storage module 3 overwritten with the code number and all other data that is to be stored therein. If storage module 3 is an electrically overwritable memory, such as an EEPROM or a flash memory, it must be protected by a password in a manner known per se, so as to prevent manipulation of the data stored therein by an unauthorized person, without storage module 3 being exchanged.

What is claimed is:
1. A microprocessor system comprising:
 a plurality of modules including a microprocessor and at least one storage module for storing code and data for the microprocessor, at least one of the modules storing a serial number of the at least one module in a non-exchangeable manner;

an arrangement for storing a code number, the code number being obtained as a function of the serial number by using an encryption method, and for storing information required to calculate the serial number from the code number, wherein the microprocessor is adapted to calculate a serial number from the code number on the basis of the information, to compare the calculated serial number to the stored serial number, and to execute or not execute at least part of the code as a function of a result of the comparison;

wherein the encryption method is asymmetrical, the code number is calculated from the serial number with the aid of a secret key, and the information includes a public key as well as a program code for calculating the serial number from the code number; and wherein at least two of the modules are each identified by a serial number, and the code number is obtained by encrypting a linking of the serial numbers of the at least two of the modules.

2. The microprocessor system according to claim 1, wherein one of the at least one module identified by the serial number is a storage module.

3. The microprocessor system according to claim 2, wherein the code number is stored in a same storage module as the serial number.

4. The microprocessor system according to claim 2, wherein the storage module is an electrically rewritable, non-volatile memory, and the code to be executed if the calculated and the stored serial numbers do not match includes a command for deletion of the storage module.

5. The microprocessor system according to claim 1, wherein one of the at least one module identified by the serial number is the microprocessor.

6. The microprocessor system according to claim 1, wherein the information required to calculate the serial number from the code number is stored in a different storage module than the code number.

7. The microprocessor system according to claim 6, wherein the different storage module is connected to the microprocessor in a non-separable manner.

8. The microprocessor system according to claim 1, wherein the microprocessor is adapted to calculate a linking of the serial numbers of the at least two modules from the code number on the basis of the information, to compare the calculated serial number to the stored linking of the serial numbers of the at least two modules.

9. The microprocessor system according to claim 1, wherein the microprocessor is adapted to calculate the serial number from the code number at regular time intervals during operation.

10. A method for detecting an exchange of a module, identified by a serial number, in a microprocessor system, the method comprising:

storing, in the microprocessor system, a code number, which is obtained from the serial number by using an encryption method, and storing information required for calculating the serial number from the code number;

reading the code number and calculating an unencrypted serial number as a function of the code number with the aid of the information;

comparing the decrypted serial number thus obtained with the serial number of the module; and detecting an exchange of the module if the serial number of the module does not match the decrypted serial number, wherein an asymmetric encryption method is used and a public key of the encryption method is included in the information required to calculate the serial number from the code number, and wherein the method is used for a plurality of modules of the microprocessor system, and the code number is obtained by encrypting a linking of the serial numbers of the plurality of modules.

11. The method according to claim 10, wherein the module is a storage module of the microprocessor system.

12. The method according to claim 11, wherein the code number is stored in the same storage module as the serial number.

13. The method according to claim 11, further comprising deleting a content of the storage module if an exchange of the module has been detected.

14. The method according to claim 10, wherein the module includes a microprocessor of the microprocessor system.

15. The method according to claim 10, wherein at least the information required for calculating the serial number is stored in a different storage module than the code number.

16. The method according to claim 10, wherein steps of the method are executed upon each start-up of the microprocessor system.

17. The method according to claim 10, wherein steps of the method are periodically executed during operation of the microprocessor system.

18. A microprocessor system, comprising:

a plurality of modules including a microprocessor and at least one storage module for storing code and data for the microprocessor, at least one of the modules storing a serial number of the at least one module in a non-exchangeable manner;

an arrangement for storing a code number, the code number being obtained as a function of the serial number by using an encryption method, and for storing information required to calculate the serial number from the code number, wherein the microprocessor is adapted to calculate a serial number from the code number on the basis of the information, to compare the calculated serial number to the stored serial number, and to execute or not execute at least part of the code as a function of a result of the comparison, wherein the information required to calculate the serial number from the code number is stored in a different storage module than the code number, the different storage module being connected to the microprocessor in a non-separable manner, wherein the encryption method is asymmetrical, the code number is calculated from the serial number with the aid of a secret key, and the information includes a public key as well as a program code for calculating the serial number from the code number, and wherein at least two of the modules are each identified by a serial number, and the code number is obtained by encrypting a linking of the serial numbers of the at least two of the modules.

19. The microprocessor according to claim 18, wherein the different storage module and the microprocessor are integrated in a one-chip microprocessor.

* * * * *